(12) United States Patent
Shi

(10) Patent No.: US 10,156,910 B1
(45) Date of Patent: Dec. 18, 2018

(54) ELECTRONIC DEVICE CAPABLE OF GESTURING OPERATION AND OPERATING METHOD THEREOF

(71) Applicant: Wistron Corporation, New Taipei (TW)

(72) Inventor: Xiaofei Shi, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 15/826,687

(22) Filed: Nov. 30, 2017

(30) Foreign Application Priority Data

Jul. 26, 2017 (CN) .......................... 2017 1 0618985

(51) Int. Cl.
*H04R 1/02* (2006.01)
*G06F 3/01* (2006.01)
(Continued)

(52) U.S. Cl.
CPC ........... *G06F 3/017* (2013.01); *H04B 1/3833* (2013.01); *H04R 1/026* (2013.01); *H04R 1/2803* (2013.01); *H04B 2001/3861* (2013.01)

(58) Field of Classification Search
CPC .......... G06F 3/011; G06F 3/017; G06F 3/041; G06F 3/042; G06F 3/044; G06F 3/0421; G06F 3/0304; G06F 3/0414; G06F 1/16; G09G 2360/144; H04R 1/02; H04R 1/028; H04R 1/026; H04R 1/28; H04R 1/2803;
(Continued)

(56) References Cited

U.S. PATENT DOCUMENTS 9,658,656 B2   5/2017  Lu et al.
2009/0295648 A1*  12/2009  Dorsey ............... H01Q 1/2266
                                                    343/702
(Continued)

FOREIGN PATENT DOCUMENTS

CN   105353879   2/2016
TW    I354225   12/2011
TW   201502885   1/2015
TW   201517737   5/2015

OTHER PUBLICATIONS

"Office Action of Taiwan Counterpart Application," dated May 29, 2018, p. 1-p. 7.

*Primary Examiner* — Thang V Tran
(74) *Attorney, Agent, or Firm* — JCIPRNET

(57) ABSTRACT

An electronic device capable of gesturing operation including a plurality of signal transceivers, a signal processor, and a central processor. The signal transceivers emit a plurality of first signals through a plurality of loudspeaker holes. The signal processor generates a plurality of parameter data correspondingly when the signal transceivers receive a plurality of second signals responding to the plurality of first signals reflected by an object through the loudspeaker holes. The central processor analyzes the parameter data to judge a coverage state and a release state of each of the loudspeaker holes, and obtains a coverage order and a release order of the loudspeaker holes accordingly. When the coverage order and the release order of the speaker holes satisfy preset conditions, the central processor outputs a control signal to control a function of the electronic device. In addition, an operating method of the above electronic device is also provided.

30 Claims, 6 Drawing Sheets

(51) Int. Cl.
*H03G 3/00* (2006.01)
*H04B 1/3827* (2015.01)
*H04R 1/28* (2006.01)

(58) Field of Classification Search
CPC ........ H04R 1/1041; H04R 3/00; H04R 29/00; H04B 1/3833; H04B 1/401; H04B 2001/3861
See application file for complete search history.

(56) References Cited

U.S. PATENT DOCUMENTS

| | | | | |
|---|---|---|---|---|
| 2010/0166223 | A9* | 7/2010 | Ranta | H04R 3/04 381/107 |
| 2013/0076485 | A1* | 3/2013 | Mullins | G06F 21/32 340/5.83 |
| 2013/0094126 | A1* | 4/2013 | Rappoport | G02B 27/01 361/679.01 |
| 2014/0166867 | A1* | 6/2014 | Shiu | G01J 1/0271 250/239 |
| 2015/0002474 | A1* | 1/2015 | Chang | G06F 3/042 345/175 |
| 2015/0029112 | A1* | 1/2015 | Macours | G06F 1/1688 345/173 |
| 2015/0036285 | A1 | 2/2015 | Lu et al. | |
| 2016/0054175 | A1* | 2/2016 | Jia | G01J 1/4204 250/216 |
| 2016/0345113 | A1* | 11/2016 | Lee | G01S 15/04 |

* cited by examiner

ELECTRONIC DEVICE CAPABLE OF GESTURING OPERATION AND OPERATING METHOD THEREOF

CROSS-REFERENCE TO RELATED APPLICATION

This application claims the priority benefit of China application serial no. 201710618985.8, filed on Jul. 26, 2017. The entirety of the above-mentioned patent application is hereby incorporated by reference herein and made a part of this specification.

BACKGROUND OF THE INVENTION

1. Field of the Invention

The invention is related to an electronic device and an operating method, in particular, to an electronic device capable of gesturing operation and an operating method of the electronic device capable of gesturing operation.

2. Description of Related Art

With the development of various mobile electronic products, there is a trend that sizes of mobile electronic products are increasingly minimized, and the functions the mobile electronic products may have more greater diversity. However, in a limited internal space, since mobile electronic product has to integrate a large amount of electronic unit to provide diverse functions, and thus it results in the consequences that the size of mobile electronic products may not effectively minimize, but the size may not be too large to carry or to use. As a result, some products available in the market have integrated two of the functions to implement in combination, for example, by designing an input connector as one both for Micro SD memory card and for Nano SIM card, or by integrating an earphone transmission function into USB Type-C. Therein, take smart phones as an example, touch screens with enlarged areas have substituted the disposition of some member buttons, such as conventional home buttons or direction buttons. Yet, power buttons and volume buttons are generally kept on sides of phone bodies for the convenience in standby state or for not interrupting application programs in usage on touch screen interfaces. As such, since the solidity of case body of mobile electronic products may be caused to decrease, and the integrity and the aesthetic of the case body may be lessened. In view of this, the invention will hereinafter provide several embodiments as solutions to reduce the disposition of member buttons of a mobile electronic product and to effectively improve the internal space utilization of a mobile electronic product.

SUMMARY OF THE INVENTION

The invention provides an electronic device capable of gesturing operation and an operating method thereof, in which a specific function of the electronic device may be operated by covering and releasing a plurality of loudspeaker holes of the electronic device, so as to effectively reduce the area of the outer shell of the electronic device, and may provide a convenient operation scheme.

An electronic device capable of gesturing operation has an outer shell and a loudspeaker mounted inside the outer shell. The position on the outer shell corresponding to the loudspeaker has a plurality of loudspeaker holes being configured to output sound. The electronic device includes a plurality of signal transceivers, a signal processor and a central processor. The plurality of signal transceivers are disposed inside the outer shell and correspond to at least one of the plurality of loudspeaker holes. The plurality of signal transceivers are configured to emit a plurality of first signals. The plurality of first signals emitted through the plurality of loudspeaker holes. The signal processor is coupled to the plurality of signal transceivers. The signal processor generates a plurality of parameter data correspondingly when the plurality of signal transceivers receive a plurality of second signals responding to the plurality of first signals reflected by an object through the plurality of loudspeaker holes. The central processor is coupled to the signal processor. The central processor is configured to analyze the plurality of parameter data to determine a coverage state and a release state of each of the plurality of loudspeaker holes, and obtain a coverage order and a release order of the plurality of loudspeaker holes accordingly. When the coverage order and the release order of the plurality of loudspeaker holes satisfy a preset condition, the central processor outputs a control signal to control a function of the electronic device.

An operating method of an electronic device capable of gesturing operation is adapted to the electronic device capable of gesturing operation. The electronic device has an outer shell and a loudspeaker mounted inside the outer shell. A position on the outer shell corresponds to the loudspeaker has a plurality of loudspeaker holes being configured to output sound. The electronic device further includes a plurality of signal transceivers, a signal processor and a central processor. The operating method includes: disposing the plurality of signal transceivers inside the outer shell, and corresponding to at least one of the plurality of loudspeaker holes, wherein the plurality of signal transceivers emit a plurality of first signals through the plurality of loudspeaker holes; generating a plurality of parameter data by the signal processor correspondingly when the plurality of signal transceivers receive a plurality of second signals responding to the plurality of first signals reflected by an object through the plurality of loudspeaker holes; analyzing the plurality of parameter data to determine a coverage state and a release state of each of the plurality of loudspeaker holes, and obtaining a coverage order and a release order of the plurality of loudspeaker holes accordingly, and determining whether the coverage order and the release order of the plurality of loudspeaker holes satisfy a preset condition; and when the coverage order and the release order of the plurality of loudspeaker holes satisfy the preset condition, outputting a control signal to control a function of the electronic device by the central processor.

Based on the above, the electronic device of the invention disposes a plurality of signal transceivers one-to-one to correspond to a plurality of loudspeaker holes, so that the signal transceivers may emit a plurality of first signals and receive a plurality of second signals through the loudspeaker holes. Moreover, the electronic device of the invention may effectively detect operation results of covering and releasing the loudspeaker holes by users according to the reception condition of the second signals, so as to correspondingly output a control signal. Therefore, the electronic device of the invention may effectively reduce the opening area of the outer shell, and may not necessarily be disposed an institutional button, and thus a convenient operation scheme may be provided.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
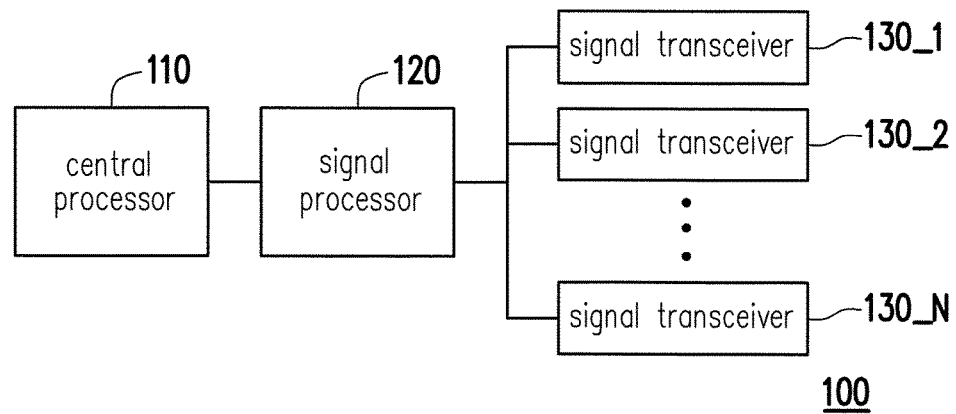
FIG. 1 illustrates a schematic view of a circuit of the electronic device according to an embodiment of the invention.

In order to make the disclosure more comprehensible, exemplary embodiments are described below as the examples to demonstrate that the disclosure can actually be realized. Moreover, wherever appropriate in the drawings and embodiments, elements/components/steps with the same reference numerals represent the same or similar parts.

FIG. 1 illustrates a schematic view of a circuit of the electronic device according to an embodiment of the invention. Referring to FIG. 1, in the embodiment, the electronic device 100 includes a central processor 110, a signal processor 120 and signal transceivers 130_1, 130_2 to 130_N, wherein N is a positive integer greater than 1. In the embodiment, each of the signal transceivers 130_1, 130_2 to 130_N includes signal emitting elements and signal receiving elements, wherein the signal emitting elements are configured to emit the first signals. The signal processor 120 is coupled to the signal transceivers 130_1, 130_2 to 130_N. Moreover, when the signal receiving elements of the signal transceivers 130_1, 130_2 to 130_N receive a plurality of second signals responding to a plurality of first signals reflected by an object, the signal transceivers 130_1, 130_2 to 130_N outputs a plurality of signals to the signal processor 120 correspondingly, such that the signal processor 120 may generate parameter data according to the reception results of the second signals. In the embodiment, the central processor 110 is coupled to the signal processor 120, and the signal processor 120 provides the parameter data to the central processor 110. The central processor 110 is configured to analyze the parameter data.

Specifically, the signal transceivers 130_1, 1302 to 130_N of the embodiment may be disposed inside, for example, the outer shell of the electronic device 100, and the signal transceivers 130_1, 130_2 to 130_N are disposed corresponding to a plurality of loudspeaker holes in an one-to-one manner, respectively (the signal transceivers may also be disposed in an one-to-many or many-to-one manner as exception, depending on the size, the number and the spacing of the loudspeaker holes, and as long as each signal transceiver corresponds to at least one loudspeaker hole). In the embodiment, the signal transceivers 130_1, 130_2 to 130_N emit and receive signals through the loudspeaker holes, and feedback the results of the received signals to the signal processor 120.

Moreover, the signal processor 120 may provide the parameter data to the central processor 110. Therefore, the central processor 110 may obtain the coverage order and each of the release order of the loudspeaker holes accordingly by analyzing the parameter data and may judge whether the coverage order and the release order satisfy the preset condition. If the coverage order and the release order of the loudspeaker holes satisfy the preset condition, the central processor 110 outputs a corresponding control signal.

In the embodiment, the central processor 110 and the signal processor 120 are respectively, for example, a Central Processing Unit (CPU), a System on Chip (SOC) or another programmable microprocessor for a general purpose or a special purpose, a Digital Signal Processor (DSP), a programmable controller, an Application Specific Integrated Circuits (ASIC), a Programmable Logic Device (PLD), other similar processors or a combination of the devices.

In the embodiment, the electronic device 100 is, for example, a Personal Digital Assistant (PDA), a Cell Phone, a Pocket PC or such type of mobile electronic products. In the embodiment, the electronic device 100 may further include a storage device, and the storage device is configured to store a plurality of software modules, such that the central processor 110 or the signal processor 120 may implement a parameter computation and an analysis described in each embodiment in the invention by performing the software modules so as to further generate parameter data or control signal. In the embodiment, the control signal generated by the central processor 110 may, for example, be applied to control a related function or an element of the electronic device 100. That is to say, the electronic device 100 of the embodiment may operate a specific function by utilizing the transceiving results of the signal transceivers 130_1, 130_2 to 130_N. Besides, the above storage device may be, for example, any type of a fixed or mobile Random Access Memory (RAM), a Read-Only Memory (ROM), a flash memory or a combination of similar elements and above elements.

Figure 2:
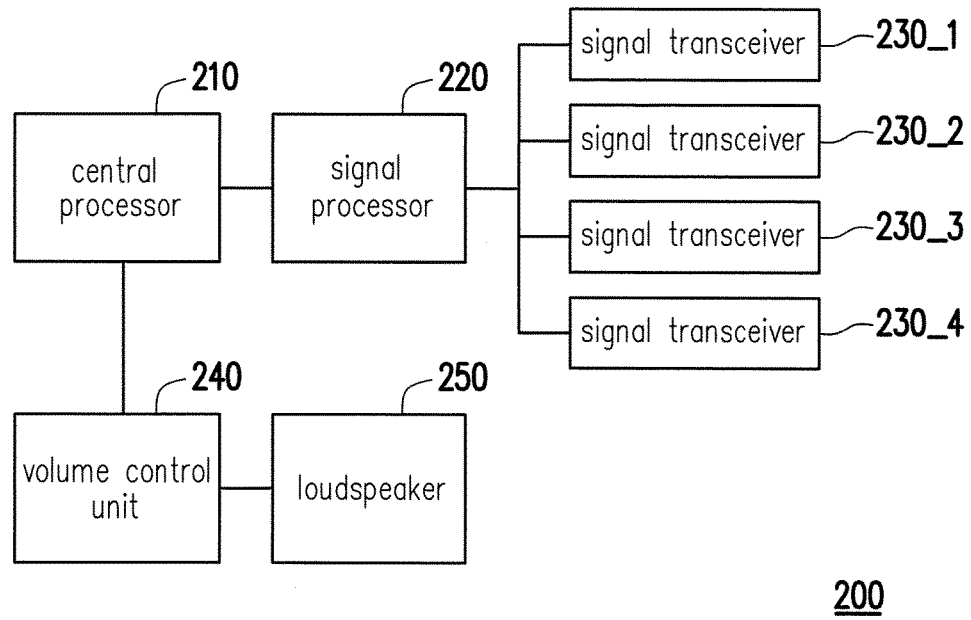
FIG. 2 illustrates a schematic view of a circuit of the electronic device according to an embodiment of the invention.
Figure 3:
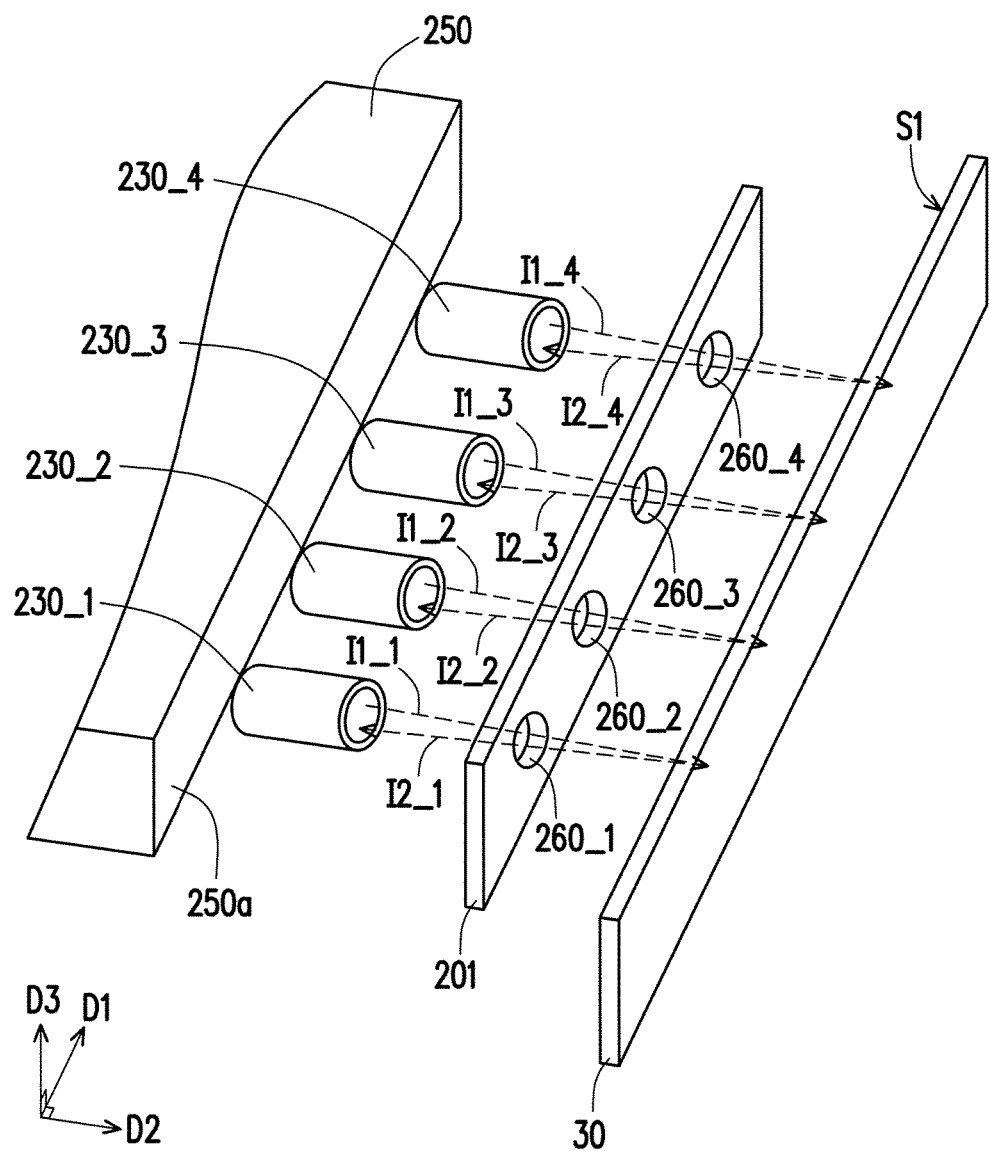
FIG. 3 illustrates a schematic view of a plurality of signal transceivers and a plurality of loudspeaker holes according to the embodiment of FIG. 2 of the invention.

FIG. 2 illustrates a schematic view of a circuit of the electronic device according to an embodiment of the invention. FIG. 3 illustrates a schematic view of a plurality of signal transceivers and a plurality of loudspeaker holes according to the embodiment of FIG. 2 of the invention. Referring to FIG. 2 and FIG. 3, the example for the number of the signal transceivers of the embodiment is four, but the invention is not limited thereto. In the embodiment, the electronic device 200 includes the central processor 210, the signal processor 220, the signal transceivers 230_1, 230_2, 230_3, 230_4, the volume control unit 240, and the loudspeaker 250. In the embodiment, the signal transceivers 230_1, 2302, 2303, and 230_4 are configured to respectively emit a plurality of first signals I1_1, I1_2, I1_3 and I1_4. The signal processor 220 is coupled to the signal transceivers 230_1, 230_2, 230_3 and 230_4. Moreover, when the signal transceivers 230_1, 230_2, 230_3 and 230_4 receive a plurality of second signals I2_1, 122, I2_3 and I2_4 responding to the first signals I1_1, I1_2, I1_3 and I1_4, the signal transceivers 230_1, 230_2, 230_3, and 230_4 output a plurality of signals to the signal processor 220, such that the signal processor 220 may generate parameter data according to the reception result of the second signals I2_1, I2_2, I2_3 and I2_4.

In the embodiment, the central processor 210 is coupled to the signal processor 220 and the volume control unit 240.

The signal processor 220 provides parameter data to the central processor 210. The central processor 210 is configured to analyze the parameter data and determine whether the volume control unit 240 outputs to the control signal according to the result of parameter data analysis. In the embodiment, the volume control unit 240 is coupled to the loudspeaker 250, and the volume control unit 240 adjusts the volume of the loudspeaker 250 according to the control signal. In the embodiment, the volume control unit 240 may be, for example, a software module stored in the electronic device 200, or may be, for example, a control circuit implemented in a form of physical circuit, and the invention is not limited thereto.

Specifically, in the embodiment, the outer shell 201 of the electronic device 200 has a plurality of loudspeaker holes 260_1, 260_2, 260_3 and 260_4 to correspond to the sound-emitting surface 250a of the loudspeaker 250 mounted inside the outer shell 201. The signal transceivers 230_1, 230_2, 230_3 and 230_4 may be disposed inside the electronic device 200. In the embodiment, the signal transceivers 230_1, 230_2, 230_3 and 230_4 and the loudspeaker holes 260_1, 260_2, 260_3 and 260_4 are respectively disposed along a first direction D1 in an one-to-one manner, and the signal transceivers 230_1, 230_2, 230_3 and 230_4 emit the first signals I1_1, I1_2, I1_3 and I1_4 in a second direction D2 through the loudspeaker holes 260_1, 260_2, 260_3 and 260_4 in sequence. In the embodiment, the first direction D1, the second direction D2 and the third direction D3 are perpendicular to each other.

In the embodiment, when the object 30 covers or shields the loudspeaker holes 260_1, 260_2, 260_3 and 260_4, the first signals I1_, I1_2, I1_3 and I1_4 are reflected on a surface S1 of the object 30, respectively, and the reflected second signals I2_1, 122, I2_3 and I2_4 are sent back through the loudspeaker holes 260_1, 260_2, 260_3 and 260_4 to the signal transceivers 230_1, 230_2, 230_3 and 230_4. In the embodiment, the signal processor 220 calculates a plurality of distance parameters according to each time difference between emitting the first signals I1_1, I1_2, I1_3 and I1_4 and receiving the second signals I2_1, I2_2, I2_3 and 124 by the signal transceivers 230_1, 230_2, 230_3 and 230_4, respectively. The distance parameters refer to each distance between the object 30 and the loudspeaker holes 260_1, 2602, 260_3 and 260_4. In the embodiment, the distance parameters are used as parameter data by the signal processor 220, and provided to the central processor 210. Therefore, the central processor 210 may judge respective coverage state of the loudspeaker holes 260_1, 260_2, 260_3 and 260_4 according to the distance parameters.

For example, if the signal processor 220 provides a distance parameter corresponding to one loudspeaker hole is less than or equal to a preset threshold value, the central processor 210 judges the one loudspeaker hole is covered. On the contrary, if the signal processor 220 provides a distance parameter corresponding to another loudspeaker hole is greater than the preset threshold value, the central processor 210 judges the another loudspeaker hole is not covered. Besides, if the signal processor 220 provides a distance parameter corresponding to yet another loudspeaker hole is less than or equal to the preset threshold value, and in a preset time, the distance parameter is greater than the preset threshold value, or even the yet another loudspeaker hole does not receive the second signals, the still another loudspeaker hole is judged by the central processor 210 to be released. In this example, the preset threshold value may be the distance between respective signal transceivers and the corresponding loudspeaker holes.

That is to say, the central processor 210 may judge whether the loudspeaker holes 260_1, 260_2, 260_3 and 260_4 are covered or released by an object 30 through the distance parameters obtained by the signal transceivers 230_1, 230_2, 230_3 and 230_4, respectively. Therefore, the central processor 210 may effectively judge coverage/release states of the loudspeaker holes 260_1, 260_2, 260_3 and 260_4 in a time interval to obtain their coverage order and release order. However, the shape, the number, the distribution and the coverage/release states of the loudspeaker holes in each embodiment of the invention are not limited to what is illustrated in FIG. 3.

In the embodiment, the signal transceivers 230_1, 230_2, 230_3 and 230_4 may be, for example, ultra-red ray transceivers or ultrasonic transceivers, and thus the first signals I1_1, I1_2, I1_3 and I1_4 and the second signals I2_1, I2_2, I2_3 and I2_4 may be, for example, ultra-red ray signals or ultrasonic signals. And, in the embodiment, the signal transceivers 230_1, 230_2, 230_3 and 230_4 are disposed between the loudspeaker 250 and the outer shell 201 of the electronic device 200, and the loudspeaker 250 emits sound through the loudspeaker holes 260_1, 260_2, 260_3 and 260_4. But the invention is not limited thereto. In one embodiment, the loudspeaker 250 may also be stacked with the signal transceivers 230_1, 2302, 230_3 and 230_4 in the third direction D3. For example, the signal transceivers 230_1, 230_2, 230_3 and 230_4 are stacked and disposed above or below the loudspeaker 250.

Figure 4:
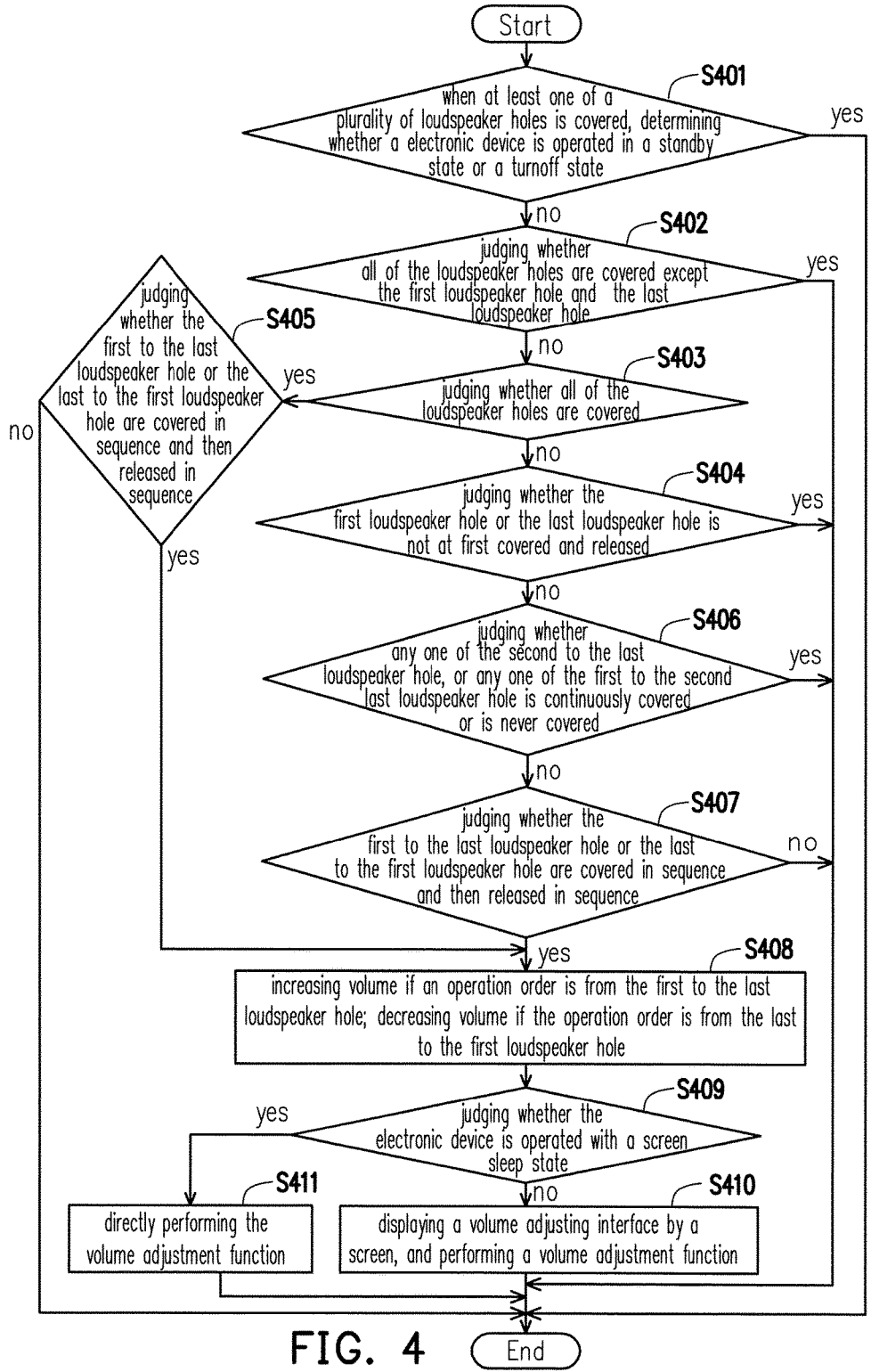
FIG. 4 illustrates a flow chart of the judgment of volume adjusting operation according to an embodiment of the invention.

FIG. 4 illustrates a flow chart of the judgment of volume adjusting operation according to an embodiment of the invention. Referring to FIG. 2, FIG. 3 and FIG. 4, the volume adjusting operation of the embodiment may, for example, be applicable to the electronic device 200 in FIG. 2 and FIG. 3. In the embodiment, the electronic device 200 has a function for adjusting volume, and when operating the electronic device 200, users may perform the volume adjusting operation of the loudspeaker 250 by ways of covering and releasing a plurality of loudspeaker holes 260_1, 260_2, 260_3 and 260_4. And, in the embodiment, the electronic device 200 further includes a screen.

In the embodiment, the step S401 to the step S407 are respectively for the purpose of judging whether the loudspeaker holes 260_1, 260_2, 260_3 and 260_4 are touched unintended. Specifically, in the step S401, the central processor 210 senses whether at least one of the loudspeaker holes 260_1, 260_2, 260_3 and 260_4 is covered by a plurality of signal transceivers 230_1, 230_2, 230_3 and 230_4. That is to say, the central processor 210 judges whether an operation incident occurs according to the sensing results of the signal transceivers 230_1, 230_2, 230_3 and 230_4. Moreover, when the central processor 210 senses that at least one of the loudspeaker holes 260_1, 2602, 260_3 and 260_4 is covered, the central processor 210 judges whether the electronic device 200 is operated in a standby state or a turnoff state. If yes, the central processor 210 judges the operation event as an unintended touch and terminates the judging procedure. If not, the central processor 210 performs the step S402.

In the step S402, the central processor 210 judges whether all of the loudspeaker holes are covered except the first loudspeaker hole 260_1 and the last loudspeaker hole 260_4. If yes, the central processor 210 judges the operation event as an unintended touch and terminates the judging procedure. If not, the central processor 210 performs the step S403.

In the step S403, the central processor 210 judges whether all of the loudspeaker holes 260_1, 260_2, 260_3 and 260_4 are covered. If yes, the central processor 210 performs the step S405. If not, the central processor 210 performs the step S404.

In the step S405, the central processor 210 judges whether the first loudspeaker hole 260_1 to the last loudspeaker hole 260_4 or the last loudspeaker hole 260_4 to the first loudspeaker hole 260_1 are covered in sequence and then released in sequence in a predetermined direction afterwards. If yes, the central processor 210 performs the step S408. If not, the central processor 210 judges the operation event as an unintended touch and terminates the judging procedure.

In the step S404, the central processor 210 judges whether the first loudspeaker hole 260_1 or the last loudspeaker hole 260_4 is not at first covered and released. If yes, the central processor 210 judges the operation event as an unintended touch and terminates the judging procedure. If not, the central processor 210 performs the step S406.

In the step S406, the central processor 210 judges whether any one of the second loudspeaker hole 260_2 to the last loudspeaker hole 260_4, or any one of the first loudspeaker hole 260_1 to the second last loudspeaker hole 260_3 is continuously covered or is never covered. If yes, the central processor 210 judges the operation event as an unintended touch and terminates the judging procedure. If not, the central processor performs the step S406.

In the step S407, the central processor 210 judges whether the first loudspeaker hole 260_1 to the last loudspeaker hole 260_4 or the last loudspeaker hole 260_4 to the first loudspeaker hole 260_1 are covered in sequence and then released in sequence. If yes, the central processor 210 performs the step S408. If not, the central processor 210 judges the operation event as an unintended touch and terminates the judging procedure.

In the step S408, if an operation order of covering and being released is from the first loudspeaker hole 260_1 to the last loudspeaker hole 2604, the central processor 210 outputs a volume increase signal to a volume control unit 240 to increase volume of the loudspeaker 250. If an operation order of covering and being released is from the last loudspeaker hole 260_4 to the first loudspeaker hole 260_1, the central processor 210 outputs a volume decrease signal to the volume control unit 240 to decrease volume of the loudspeaker 250. And, the central processor 260 successively performs the step S409.

In the step S409, the central processor 210 judges whether the electronic device 200 is operated with the screen in a sleep state. If yes, the central processor performs the step S411 to directly perform volume adjusting. If not, the central processor 210 displays a volume adjusting interface by the screen and performs volume adjusting.

Figure 5A:
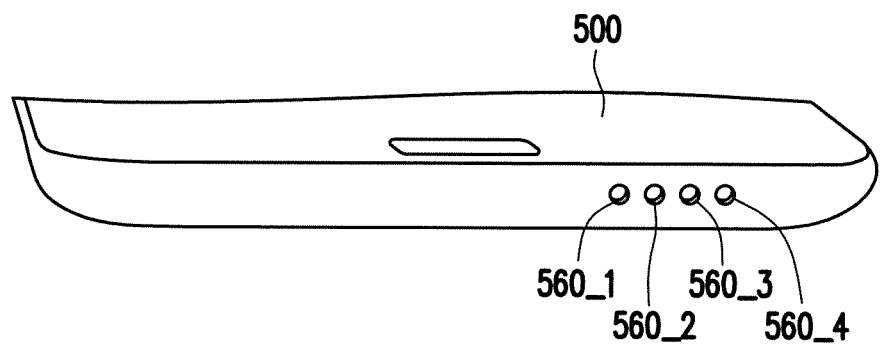
FIG. 5A to FIG. 5D illustrates a schematic view of the coverage and the release of a plurality of loudspeaker holes according to an embodiment of the invention.
Figure 5B:
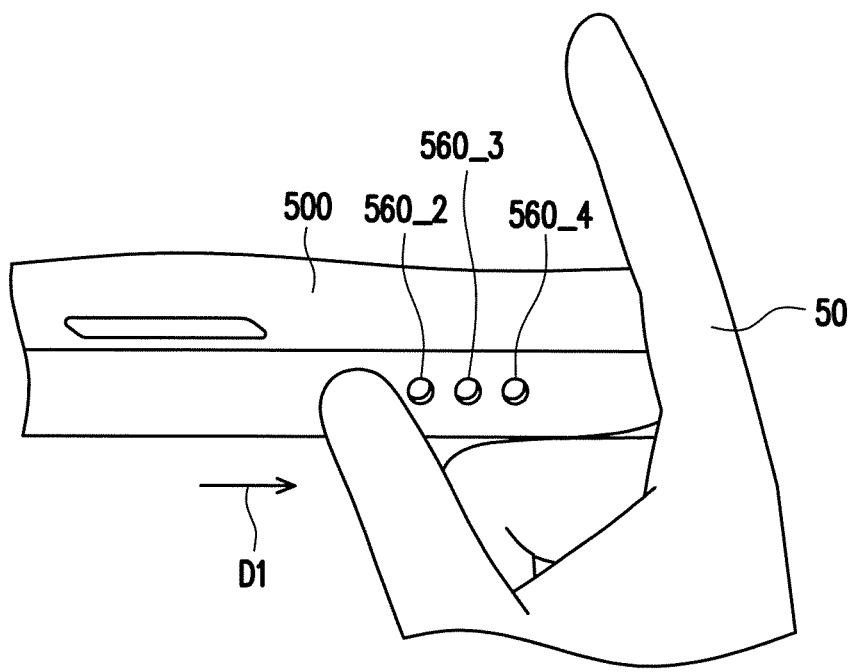

FIG. 5A to FIG. 5D illustrates a schematic view of the coverage and the release of a plurality of loudspeaker holes according to an embodiment of the invention. Referring to FIG. 5A to FIG. 5D, FIG. 5A to FIG. 5D are an exemplary embodiment of the invention, but the invention is not limited thereto. In FIG. 5A, an electronic device 500 has loudspeaker holes 560_1, 560_2, 560_3 and 560_4. When operating the electronic device 500, users may perform volume adjusting operation by ways of covering and releasing a plurality of loudspeaker holes 560_1, 560_2, 560_3, and 560_4 by using an object 50. The object 50 may be, for example, a finger of a user, but the invention is not limited thereto. Therefore, in FIG. 5B, when the electronic device 500 judges that the loudspeaker hole 560_1 is covered by the object 50, the electronic device 500 may, for example, perform the above judging procedure in the embodiment of FIG. 4.

Figure 5C:
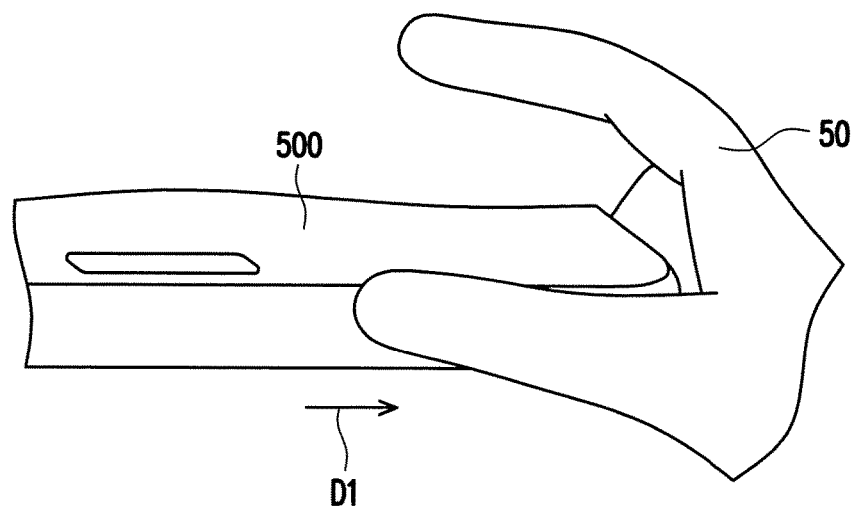
Figure 5D:
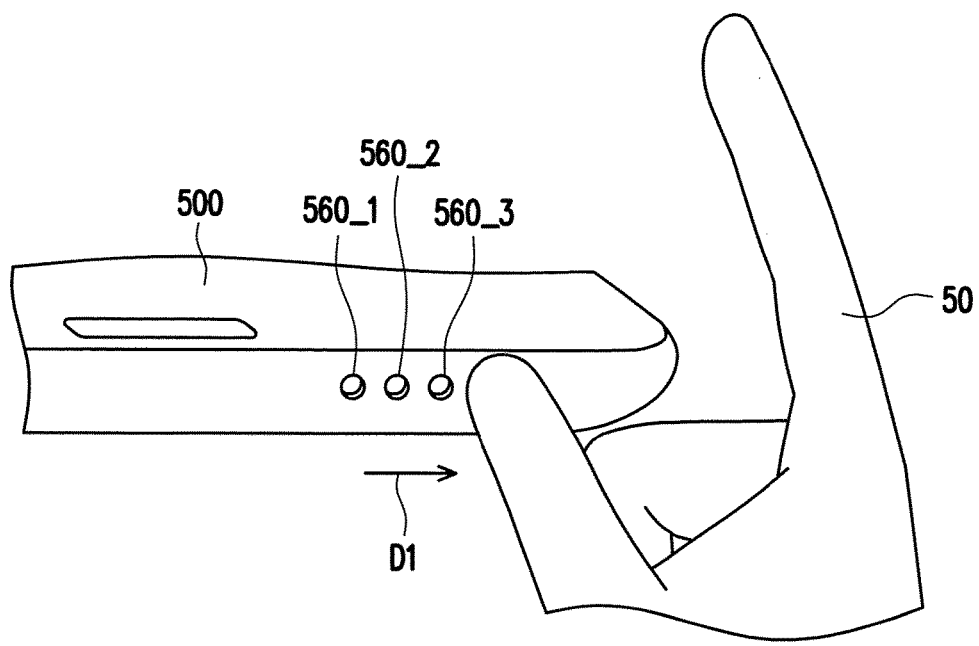

Firstly, in FIG. 5C, the loudspeaker holes 560_1, 560_2, 560_3, and 560_4 are covered by the object 50 in the first direction D1 in sequence until all of the loudspeaker holes 560_1, 560_2, 560_3, and 560_4 are covered by the object 50, or all of the loudspeaker holes 560_1, 560_2, 560_3, and 560_4 are simultaneously covered by the object 50 at a time. Afterwards, in FIG. 5D, the loudspeaker holes 560_1, 560_2, 560_3, and 560_4 are released in the first direction D1 in sequence until all of the loudspeaker holes 560_1, 560_2, 560_3, and 560_4 are released by the object 50. Therefore, the electronic device 500 judges the operation event as volume increase operation. However, in another operation event, if the loudspeaker holes 560_1, 560_2, 560_3, and 560_4 are covered by the object 50 in the opposite direction to the first direction D1 in sequence or simultaneously, and then the loudspeaker holes 560_1, 560_2, 560_3, and 560_4 are released are released by the object 50 in the opposite direction to the first direction D1, the electronic device 500 judges the another operation event as volume decrease operation. That is, users may provide gesturing operation to the loudspeaker holes 560_1, 560_2, 560_3, and 560_4 of the electronic device 500, such that the electronic device 500 performs volume adjusting operation according to the coverage order and the release order of the loudspeaker holes 560_1, 560_2, 560_3, and 560_4.

Figure 6:
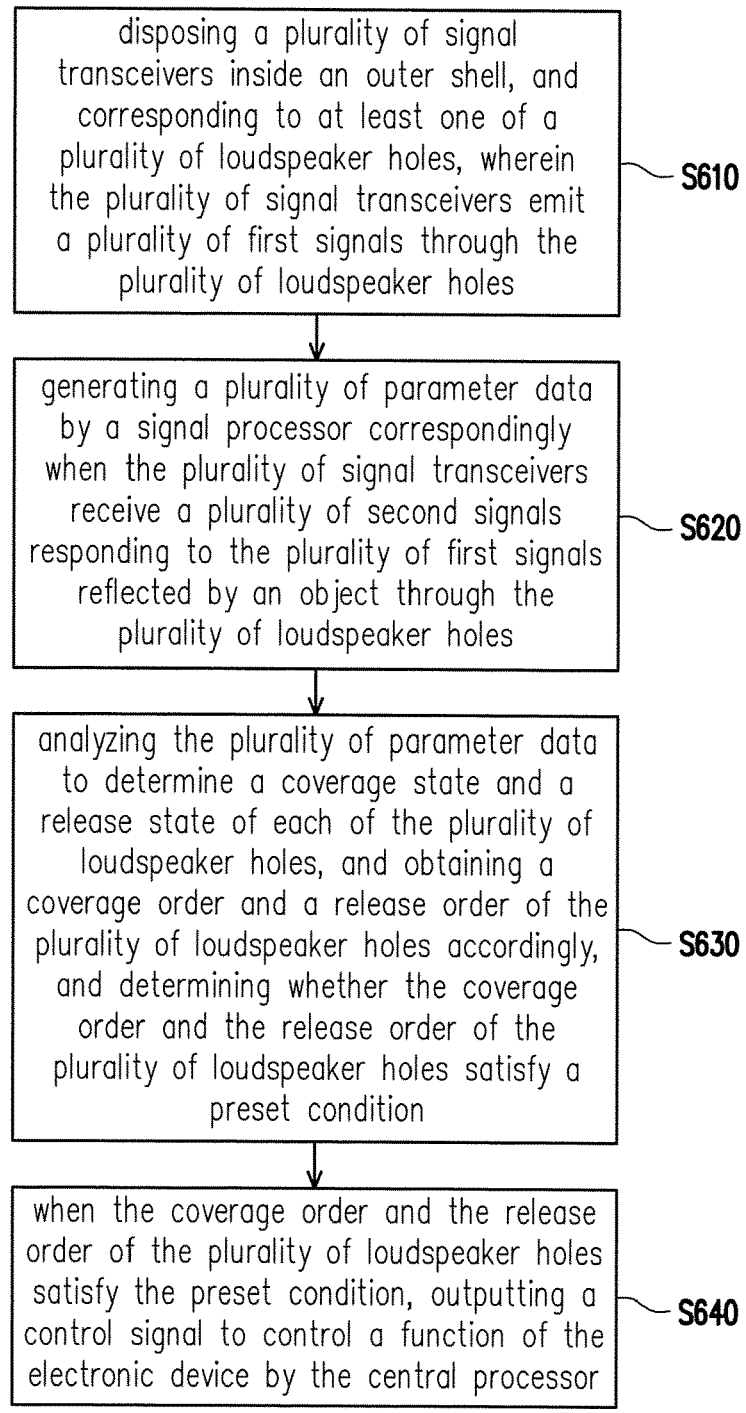
FIG. 6 illustrates a flow chart of the operating method of the electronic device according to an embodiment of the invention.

FIG. 6 illustrates a flow chart of the operating method of the electronic device according to an embodiment of the invention. Referring to FIG. 1 and FIG. 6, an operating method of FIG. 6 may, for example, be applicable to the electronic device 100 of FIG. 1. In the step S610, the electronic device 100 disposes a plurality of signal transceivers 130_1, 130_2 to 130N inside the outer shell, and correspond to at least one of a plurality of loudspeaker holes. The signal transceivers 130_1, 130_2 to 130_N emit a plurality of first signals through the loudspeaker holes. In the step S620, the electronic device 100 generates a plurality of parameter data by the signal processor 120 correspondingly when the signal transceivers 130_1, 130_2 to 130_N receive a plurality of second signals responding to the first signals reflected by an object through the loudspeaker holes. In the step S630, the electronic device 100 analyzes the parameter data to determine a coverage state and a release state of each of the loudspeaker holes by the central processor 110. The electronic device 100 obtains a coverage order and a release order of the loudspeaker holes accordingly, and determines whether the coverage order and the release order of the loudspeaker holes satisfy a preset condition. In the step S640, when the coverage order and the release order of the loudspeaker holes satisfy the preset condition, the central processor 110 output a control signal to control a function of the electronic device 100. Therefore, the electronic device 100 of the embodiment may effectively judge the operation results of covering and releasing the loudspeaker holes by users according to the state in which the signal transceivers 130_1, 130_2 to 130_N receive the second signals, so as to correspondingly output a control signal and to control at least one of functions of the electronic device 100, and not limited to the above volume adjusting function. The function may also be an operating function having increment and decrement or directivity, which may control screen brightness adjustment, scrolling in applications or the like.

In summary, the electronic device capable of gesturing operation and the operating method thereof of the invention may be used to operate the electronic device to perform a volume adjusting function by judging whether the loudspeaker holes are covered or released in correspondence to gesturing operation of users, and output a control signal according to the judging result. Therefore, the electronic device of the invention may effectively reduce the opening area of the outer shell because the electronic device of the invention needs no additional disposition of a volume control button. Accordingly, a convenient operation scheme may be provided since it is not required to further dispose the institutional buttons.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electronic device capable of gesturing operation, having an outer shell and a loudspeaker mounted inside the outer shell, wherein a position on the outer shell corresponding to the loudspeaker has a plurality of loudspeaker holes being configured to output sound, and the electronic device comprising:
    a plurality of signal transceivers, disposed inside the outer shell and correspond to at least one of the plurality of loudspeaker holes, the plurality of signal transceivers are configured to emit a plurality of first signals, and the plurality of first signals emitted through the plurality of loudspeaker holes;
    a signal processor, coupled to the plurality of signal transceivers, configured to generate a plurality of parameter data correspondingly when the plurality of signal transceivers receive a plurality of second signals responding to the plurality of first signals reflected by an object through the plurality of loudspeaker holes; and
    a central processor, coupled to the signal processor, the central processor is configured to analyze the plurality of parameter data to determine a coverage state and a release state of each of the plurality of loudspeaker holes, and obtain a coverage order and a release order of the plurality of loudspeaker holes accordingly, when the coverage order and the release order of the plurality of loudspeaker holes satisfy a preset condition, the central processor outputs a control signal to control a function of the electronic device.

2. The electronic device capable of gesturing operation according to claim 1, wherein the signal processor calculates a plurality of distance parameters respectively according to time differences of the plurality of first signals being emitted and a plurality of the second signals being received by the plurality of signal transceivers,
    wherein the plurality of parameter data comprise the plurality of distance parameters, and the central processor determines the coverage state and the release state of each of the plurality of loudspeaker holes according to whether the plurality of distance parameters are less than a threshold value.

3. The electronic device capable of gesturing operation according to claim 2, wherein the central processor determines the coverage order of the plurality of loudspeaker holes according to the coverage state and an order of the coverage state of each of the plurality of loudspeaker holes.

4. The electronic device capable of gesturing operation according to claim 2, wherein the central processor determines the release order of the plurality of loudspeaker holes according to the coverage state and the release of an order of the coverage state of each of the plurality of loudspeaker holes.

5. The electronic device capable of gesturing operation according to claim 1, wherein when the plurality of loudspeaker holes are covered in sequence or simultaneously, and released in sequence in a predetermined direction afterwards, the central processor determines the coverage order of the plurality of loudspeaker holes and the release order satisfy the preset condition.

6. The electronic device capable of gesturing operation according to claim 1, further comprises:
    a volume control unit, coupled to the central processor, the volume control unit is configured to receive the control signal provided by the central processor,
    wherein the loudspeaker is coupled to the volume control unit, and the volume control unit operates a volume adjusting function of the loudspeaker according to the control signal.

7. The electronic device capable of gesturing operation according to claim 6, wherein if the central processor determines the plurality of loudspeaker holes are covered in a first direction in sequence or simultaneously, and the plurality of loudspeaker holes are released in sequence in the first direction, the central processor controls the volume control unit to output a volume increase signal to the loudspeaker, such that the loudspeaker increases volume.

8. The electronic device capable of gesturing operation according to claim 6, wherein if the central processor determines the plurality of loudspeaker holes are covered in a direction opposite to a first direction in sequence or simultaneously, and the plurality of loudspeaker holes are released in sequence in the direction opposite to the first direction, the central processor controls the volume control unit to output a volume decrease signal to the loudspeaker, such that the loudspeaker decreases volume.

9. The electronic device capable of gesturing operation according to claim 1, wherein the plurality of signal transceivers and the plurality of loudspeaker holes are respectively correspondingly disposed along a first direction, and the plurality of signal transceivers emit the plurality of first signals through the plurality of loudspeaker holes in a second direction in sequence, wherein the first direction is perpendicular to the second direction.

10. The electronic device capable of gesturing operation according to claim 1, wherein the plurality of signal transceivers are a plurality of ultrasonic transceivers, wherein the plurality of first signals and the plurality of second signals are a plurality of ultrasonic signals.

11. An operating method of an electronic device capable of gesturing operation, adapting to the electronic device capable of gesturing operation, wherein the electronic device has an outer shell and a loudspeaker mounted inside the outer shell, and a position on the outer shell corresponds to the loudspeaker has a plurality of loudspeaker holes being configured to output sound, wherein the electronic device further comprises a plurality of signal transceivers, a signal processor and a central processor, and the operating method comprises:
    disposing the plurality of signal transceivers inside the outer shell, and corresponding to at least one of the plurality of loudspeaker holes, wherein the plurality of signal transceivers emit a plurality of first signals through the plurality of loudspeaker holes;
    generating a plurality of parameter data by the signal processor correspondingly when the plurality of signal transceivers receive a plurality of second signals responding to the plurality of first signals reflected by an object through the plurality of loudspeaker holes;

analyzing the plurality of parameter data to determine a coverage state and a release state of each of the plurality of loudspeaker holes, and obtaining a coverage order and a release order of the plurality of loudspeaker holes accordingly, and determining whether the coverage order and the release order of the plurality of loudspeaker holes satisfy a preset condition; and when the coverage order and the release order of the plurality of loudspeaker holes satisfy the preset condition, outputting a control signal to control a function of the electronic device by the central processor.

12. The operating method of an electronic device capable of gesturing operation according to claim 11, wherein the step of analyzing the plurality of parameter data to determine the coverage state and the release state of the plurality of loudspeaker holes, and obtaining the coverage order and the release order of the plurality of loudspeaker holes comprises:

calculating a plurality of distance parameters by the signal processor respectively according to time differences of the plurality of first signals being emitted and a plurality of the second signals being received by the plurality of signal transceivers; and determining the coverage state and the release state of each of the plurality of loudspeaker holes by the central processor according to whether the plurality of distance parameters are less than a threshold value.

13. The operating method of an electronic device capable of gesturing operation according to claim 12, wherein the step of analyzing the plurality of parameter data to determine the coverage state and the release state of the plurality of loudspeaker holes, and obtaining the coverage order and the release order of the plurality of loudspeaker holes further comprises:

determining the coverage order of the plurality of loudspeaker holes by the central processor according to the coverage state and an order of the coverage state of each of the plurality of loudspeaker holes.

14. The operating method of an electronic device capable of gesturing operation according to claim 12, wherein the step of analyzing the plurality of parameter data to determine the coverage state and the release state of the plurality of loudspeaker holes, and obtaining the coverage order and the release order of the plurality of loudspeaker holes further comprises:

determining the release order of the plurality of loudspeaker holes by the central processor according to the coverage state and the release of an order of the coverage state of each of the plurality of loudspeaker holes.

15. The operating method of an electronic device capable of gesturing operation according to claim 11, wherein the step of determining the coverage order and the release order of the plurality of loudspeaker holes satisfy a preset condition comprises:

when the plurality of loudspeaker holes are covered in sequence or simultaneously, and released in sequence in a predetermined direction afterwards, determining the coverage order of the plurality of loudspeaker holes and the release order satisfy the preset condition by the central processor.

16. The operating method of an electronic device capable of gesturing operation according to claim 11, wherein the electronic device further comprises a volume control unit, and the operating method further comprises:

receiving the control signal provided by the central processor by the volume control unit; and operating a volume adjusting function of the loudspeaker by the volume control unit according to the control signal.

17. The operating method of an electronic device capable of gesturing operation according to claim 16, wherein the step of operating a volume adjusting function of the loudspeaker by the volume control unit according to the control signal comprises:

if the central processor determines the plurality of loudspeaker holes are covered in a first direction in sequence or simultaneously, and the plurality of loudspeaker holes are released in sequence in the first direction, controlling the volume control unit by the central processor to output a volume increase signal to the loudspeaker, such that the loudspeaker increases volume.

18. The operating method of an electronic device capable of gesturing operation according to claim 16, wherein the step of operating a volume adjusting function of the loudspeaker by the volume control unit according to the control signal comprises:

if the central processor determines the plurality of loudspeaker holes are covered in a direction opposite to a first direction in sequence or simultaneously, and the plurality of loudspeaker holes are released in sequence in the direction opposite to the first direction, controlling the volume control unit by the central processor to output a volume decrease signal to the loudspeaker, so that the loudspeaker decreases a volume.

19. The operating method of an electronic device capable of gesturing operation according to claim 11, wherein the plurality of signal transceivers and the plurality of loudspeaker holes are respectively correspondingly disposed along a first direction, and the plurality of signal transceivers emit the plurality of first signals through the plurality of loudspeaker holes in a second direction in sequence, wherein the first direction is perpendicular to the second direction.

20. The operating method of an electronic device capable of gesturing operation according to claim 11, wherein the plurality of signal transceivers are a plurality of ultrasonic transceivers, wherein the plurality of first signals and the plurality of second signals are a plurality of ultrasonic signals.

21. An electronic device capable of gesturing operation, having an outer shell and a loudspeaker mounted inside the outer shell, wherein a position on the outer shell corresponding to the loudspeaker has a plurality of loudspeaker holes being configured to output sound, and the electronic device comprising:

a plurality of signal transceivers, disposed inside the outer shell and correspond to at least one of the plurality of loudspeaker holes, the plurality of signal transceivers are configured to emit a plurality of first signals, and the plurality of first signals emitted through the plurality of loudspeaker holes;

a signal processor, coupled to the plurality of signal transceivers, configured to generate a plurality of parameter data correspondingly when the plurality of signal transceivers receive a plurality of second signals responding to the plurality of first signals reflected by an object through the plurality of loudspeaker holes; and a central processor, coupled to the signal processor, the central processor is configured to analyze the plurality of parameter data to determine a coverage state of each of the plurality of loudspeaker holes, and obtain a coverage order of the plurality of loudspeaker holes accordingly, when the coverage order of the plurality of loudspeaker holes satisfy a preset condition, the central processor outputs a control signal to control a function of the electronic device.

22. The electronic device capable of gesturing operation according to claim 21, wherein the signal processor calculates a plurality of distance parameters respectively according to time differences of the plurality of first signals being emitted and a plurality of the second signals being received by the plurality of signal transceivers, wherein the plurality of parameter data comprise the plurality of distance parameters, and the central processor determines the coverage state of each of the plurality of loudspeaker holes according to whether the plurality of distance parameters are less than a threshold value.

23. The electronic device capable of gesturing operation according to claim 22, wherein the central processor determines the coverage order of the plurality of loudspeaker holes according to the coverage state and an order of the coverage state of each of the plurality of loudspeaker holes.

24. The electronic device capable of gesturing operation according to claim 21, wherein when the plurality of loudspeaker holes are covered in sequence or simultaneously, the central processor determines the coverage order of the plurality of loudspeaker holes satisfy the preset condition.

25. The electronic device capable of gesturing operation according to claim 21, further comprises:

a volume control unit, coupled to the central processor, the volume control unit is configured to receive the control signal provided by the central processor, wherein the loudspeaker is coupled to the volume control unit, and the volume control unit operates a volume adjusting function of the loudspeaker according to the control signal.

26. The electronic device capable of gesturing operation according to claim 25, wherein if the central processor determines the plurality of loudspeaker holes are covered in a first direction in sequence or simultaneously, the central processor controls the volume control unit to output a volume increase signal to the loudspeaker, such that the loudspeaker increases volume.

27. The electronic device capable of gesturing operation according to claim 25, wherein if the central processor determines the plurality of loudspeaker holes are covered in a direction opposite to a first direction in sequence or simultaneously, the central processor controls the volume control unit to output a volume decrease signal to the loudspeaker, such that the loudspeaker decreases volume.

28. The electronic device capable of gesturing operation according to claim 21, wherein the plurality of signal transceivers and the plurality of loudspeaker holes are respectively correspondingly disposed along a first direction, and the plurality of signal transceivers emit the plurality of first signals through the plurality of loudspeaker holes in a second direction in sequence, wherein the first direction is perpendicular to the second direction.

29. The electronic device capable of gesturing operation according to claim 21, wherein the plurality of signal transceivers are a plurality of ultrasonic transceivers, wherein the plurality of first signals and the plurality of second signals are a plurality of ultrasonic signals.

30. An operating method of an electronic device capable of gesturing operation, adapting to the electronic device capable of gesturing operation, wherein the electronic device has an outer shell and a loudspeaker mounted inside the outer shell, and a position on the outer shell corresponds to the loudspeaker has a plurality of loudspeaker holes being configured to output sound, wherein the electronic device further comprises a plurality of signal transceivers, a signal processor and a central processor, and the operating method comprises:

disposing the plurality of signal transceivers inside the outer shell, and corresponding to at least one of the plurality of loudspeaker holes, wherein the plurality of signal transceivers emit a plurality of first signals through the plurality of loudspeaker holes;

generating a plurality of parameter data by the signal processor correspondingly when the plurality of signal transceivers receive a plurality of second signals responding to the plurality of first signals reflected by an object through the plurality of loudspeaker holes;

analyzing the plurality of parameter data to determine a coverage state of each of the plurality of loudspeaker holes, and obtaining a coverage order of the plurality of loudspeaker holes accordingly, and determining whether the coverage order of the plurality of loudspeaker holes satisfy a preset condition; and when the coverage order of the plurality of loudspeaker holes satisfy the preset condition, outputting a control signal to control a function of the electronic device by the central processor.

* * * * *